United States Patent
Nagase et al.

(10) Patent No.: US 9,904,151 B2
(45) Date of Patent: Feb. 27, 2018

(54) PROJECTOR AND IMAGE PROJECTION METHOD

(71) Applicant: NEC Display Solutions, Ltd., Tokyo (JP)

(72) Inventors: Noriko Nagase, Tokyo (JP); Atsushi Kato, Tokyo (JP); Isao Takahashi, Tokyo (JP); Takashi Ishikawa, Tokyo (JP); Hirotaka Koyama, Tokyo (JP)

(73) Assignee: NEC DISPLAY SOLUTIONS, LTD., Tokyo (JP)

( * ) Notice: Subject to any disclaimer, the term of this patent is extended or adjusted under 35 U.S.C. 154(b) by 0 days.

(21) Appl. No.: 15/317,835

(22) PCT Filed: Jul. 29, 2014

(86) PCT No.: PCT/JP2014/069909
§ 371 (c)(1),
(2) Date: Dec. 9, 2016

(87) PCT Pub. No.: WO2016/016939
PCT Pub. Date: Feb. 4, 2016

(65) Prior Publication Data
US 2017/0139311 A1 May 18, 2017

(51) Int. Cl.
*G03B 21/00* (2006.01)
*G03B 21/28* (2006.01)
(Continued)

(52) U.S. Cl.
CPC ....... *G03B 21/008* (2013.01); *G02B 26/0833* (2013.01); *G02B 27/141* (2013.01); *G02B 27/149* (2013.01); *G03B 21/28* (2013.01)

(58) Field of Classification Search
CPC .... G03B 21/008; G03B 21/28; G03B 21/208; G03B 21/2066; H04N 9/315; H04N 9/3161; H04N 9/3164
See application file for complete search history.

(56) References Cited

U.S. PATENT DOCUMENTS

2002/0176054 A1* 11/2002 Mihalakis ............ H04N 9/3167 353/31
2014/0049698 A1* 2/2014 Hirata .................. G03B 21/006 349/9

(Continued)

FOREIGN PATENT DOCUMENTS

JP   H 10-133277 A   5/1998
JP   2000-039583 A   2/2000

(Continued)

OTHER PUBLICATIONS

International Search Report (ISR) (PCT Form PCT/ISA/210), in PCT/JP2014/069909, dated Oct. 28, 2014.

(Continued)

*Primary Examiner* — Sultan Chowdhury
(74) *Attorney, Agent, or Firm* — McGinn IP Law Group, PLLC.

(57) ABSTRACT

A projector includes: a plurality of image-forming units each including an image forming surface provided with a plurality of micromirrors; a plurality of reflecting units that are provided so as to respectively reflect the plurality of image beams formed by the image-forming units; a beam-combining unit that receives the plurality of image beams via the plurality of reflecting units and emits a combined image beam in which the plurality of image beams are combined such that the propagation directions coincide; and a projection unit that projects the combined image beam emitted from the beam-combining unit. At least two of the image-forming units are arranged such that the image-forming surface of each image-forming means lies in the same plane.

19 Claims, 9 Drawing Sheets

(51) Int. Cl.
G02B 26/08 (2006.01)
G02B 27/14 (2006.01)

(56) References Cited

U.S. PATENT DOCUMENTS

2014/0320826 A1* 10/2014 Nagasawa ............ H04N 5/7458
353/33
2014/0347634 A1* 11/2014 Bommerbach ...... H04N 9/3158
353/31
2015/0160462 A1* 6/2015 Takahara ............. G02B 27/126
359/634

FOREIGN PATENT DOCUMENTS

| JP | 2000-330072 A | 11/2000 |
| JP | 2001-249406 A | 9/2001 |
| JP | 2005-227695 A | 8/2005 |
| JP | 2006-098881 A | 4/2006 |
| JP | 2006-343632 A | 12/2006 |
| JP | 2008-281665 A | 11/2008 |
| JP | 2009-150973 A | 7/2009 |

OTHER PUBLICATIONS

Japanese Office Action, dated Oct. 31, 2017, in Japanese Application No. 2016-537631 and English Translation thereof.

* cited by examiner

PROJECTOR AND IMAGE PROJECTION METHOD

TECHNICAL FIELD

The present invention relates to a projector that is provided with a plurality of digital micromirror devices (DMD).

BACKGROUND ART

Patent Document 1 discloses a projection-type display device that is provided with three DMDs. FIG. 1 is a schematic perspective view showing the principal parts of the projection-type display device disclosed in Patent Document 1.

Referring to FIG. 1, projection-type display device 1000 is equipped with lighting optical system 100, light color separation optical system 200, three DMDs 300R, 300G, and 300B, three Total Internal Reflection (TIR) prisms 400R, 400G, and 400B, cross-dichroic prism 500, and projection lens 600.

Lighting optical system 100 is provided with light source 110, first lens array 120, second lens array 130, polarization conversion optical system 140, and superposing lens 150. The light beam from light source 110 is separated into a plurality of component light beams by first lens array 120. Each component light beam is irradiated into polarization conversion optical system 140 via second lens array 130. Polarization conversion optical system 140 arranges the polarized light of each component light beam into p-polarized light. Superposing lens 150 superposes each component light beam (p-polarized light) that is emitted from polarization conversion optical system 140 upon the image-forming surfaces of DMDs 300R, 300G, and 300B, respectively.

Light color separation optical system 200 is provided with cross-dichroic prism 210, dichroic mirror 220, reflecting mirrors 230 and 240, and condenser lenses 250 and 260. Cross-dichroic prism 210 color-separates the light beam from lighting optical system 100 into a red component light beam and a light beam that contains the blue component and the green component. The red component light beam is irradiated upon DMD 300R via reflecting mirrors 230 and 240, condenser lenses 250 and 260, and TIR prism 400R. The light beam that contains the blue component and the green component is irradiated upon dichroic mirror 220 by way of reflecting mirror 230 and condenser lens 250. Dichroic mirror 220 transmits light of the blue component and reflects light of the green component. The light beam of the green component that is reflected by dichroic mirror 220 is irradiated into DMD 300G by way of TIR prism 400G. The light beam of the blue component that is transmitted through dichroic mirror 220 is irradiated into DMD 300B by way of TIR prism 400B.

The red image beam from DMD 300R is irradiated into the first incident surface of cross-dichroic prism 500 by way of TIR prism 400R. The green image beam from DMD 300G is irradiated into the second incident surface of cross-dichroic prism 500 by way of TIR prism 400G. The blue image beam from DMD 300B is irradiated into the third incident surface of cross-dichroic prism 500 by way of TIR prism 400B. Half-wave plate 700 is provided on the surface of TIR prism 400G that is opposite the second incident surface of cross-dichroic prism 500.

Cross-dichroic prism 500 includes red light reflecting surface 506 and blue light reflecting surface 508 that are provided so as to intersect each other. Red light reflecting surface 506 has the characteristic of reflecting the red light component and transmitting the colored light whose wavelength is shorter than that of the red light component. Blue light reflecting surface 508 has the characteristic of reflecting the blue light component and transmitting the colored light whose wavelength is longer than that of blue light. The red image beam that is incident from the first surface is reflected by red light reflecting surface and emitted in the direction of projection lens 600. The green image beam that is incident from the second incident surface is transmitted through both red light reflecting surface 506 and blue light reflecting surface 508 and emitted in the direction of projection lens 600 without undergoing alteration. The blue image beam that is incident from the third incident surface is reflected by blue light reflecting surface 508 and emitted in the direction of projection lens 600. In this way, cross-dichroic prism 500 emits toward projection lens 600 a combined image beam in which the red image beam, green image beam and blue image beam have been color-combined.

Projection lens 600 projects the combined image beam from cross-dichroic prism 500 upon a screen.

DMDs 300R, 300G, and 300B are of the same construction. FIG. 2 gives a schematic representation of the relation between the image-forming surface of a DMD and incident light. As shown in FIG. 2, image-forming surface 302 is composed of a plurality of micromirrors 304 arranged in matrix form. Micromirror 304 is quadrilateral in shape and is configured to rotate at a predetermined angle with the diagonal line that joins the lower left vertex and the upper right vertex as axis of rotation 304c. The angle that is formed between incident ray IR and rotational axis 304c is 90 degrees, and the angle that is formed between incident ray IR and the horizontal direction h (the row direction) of image-forming surface 302 when viewed from the direction perpendicular to image-forming surface 302 is approximately 45 degrees (the limit of the direction of incidence). In the projection-type display device shown in FIG. 1, DMDs 300R, 300G, and 300B are arranged to enclose the side surfaces of cross-dichroic prism 500. Due to the above-described limit of the direction of incidence, DMDs 300R, 300G, and 300B are arranged inclined such that long sides of the image-forming surfaces intersect the plane that contains the center light ray of each of the red light beam, green light beam and blue light beam at approximately 45 degrees.

LITERATURE OF THE PRIOR ART

Patent Documents

Patent Document 1: Japanese Unexamined Patent Application Publication No. 2000-330072

DISCLOSURE OF INVENTION

However, the projection-type display device described in Patent Document 1 has the following problems.

In cross-dichroic prism 500, the red image that is formed by DMD 300R and the green image that is formed by DMD 300G overlap such that the longitudinal directions coincide. In contrast, the blue image that is formed by DMD 300B overlaps such that the longitudinal direction crosses the red image or green image. The blue image therefore overlaps such that its longitudinal direction intersects (intersects in X-form) the red image and green image, whereby the problem arises that a combined image is projected in which the images of each color are not properly superposed.

The above-described problem can be solved by rotating DMD 300B by 90 degrees such that the longitudinal direction of the blue image coincides with the longitudinal direction of the red image and green image. In this case, however, a detour optical path (including a relay lens and mirrors) becomes necessary to cause the blue light to enter DMD 300B by way of TIR prism 400B from the projection lens 600 side, resulting in a device having greater scale and complexity.

In addition, because DMDs 300R, 300G, and 300B are arranged at an inclination of approximately 45 degrees, the red image, green image and blue image are each projected in a state inclined by approximately 45 degrees with respect to the horizontal direction. In order to solve the problem of this inclination, in the housing, the optical unit that accommodates the optical components shown in FIG. 1 is normally tilted such that the projected image becomes horizontal. This tilting of the optical unit in the housing entails the problems of greater scale and complexity of the device.

It is an object of the present invention to provide a compact projector and an image projection method that can solve the above-described problems and that can superpose the images of each color such that their long sides coincide. According to an aspect of the present invention for achieving the above-described object, a projector is provided that includes:

a plurality of image-forming means that are each provided with an image-forming surface including a plurality of micromirrors;

a plurality of reflecting means that are provided so as to each reflect respective image beams that are formed by the plurality of image-forming means;

beam-combining means into which the plurality of image beams are irradiated by way of the plurality of reflecting means and that emits a combined image beam in which the plurality of image beams have been combined such that their directions of propagation coincide; and projection means that projects the combined image beam that is emitted by the beam-combining means;

wherein, of the plurality of image forming means, at least two image-forming means are arranged such that their image-forming surfaces are located in the same plane.

According to another aspect of the present invention, a projector is provided that includes:

a plurality of image-forming means that are each provided with an image-forming surface including a plurality of micromirrors;

a plurality of reflecting means that are provided so as to each reflect respective image beams that are formed by the plurality of image-forming means;

a cross-dichroic prism into which the plurality of image beams are irradiated by way of the plurality of reflecting means and that emits a combined image beam in which the plurality of image beams have been combined such that their directions of propagation coincide; and projection means that projects the combined image beam that is emitted by the beam-combining means;

wherein, of the plurality of image forming means, at least two image-forming means are arranged such that their image-forming surfaces are located parallel to a plane that is perpendicular to a dichroic film of the cross-dichroic prism.

According to another aspect of the present invention, an image projection method is provided in which a plurality of image-forming means that are each equipped with an image-forming surface having a plurality of micromirrors are used to form an image beam formed on the image-forming surfaces and the image beam then projected by means of projection means, the image projection method including:

arranging, of the plurality of image-forming means, at least two image-forming means such that their image-forming surfaces are located on the same plane;

by means of reflecting means, reflecting each of the plurality of image beams that are formed by the plurality of image-forming means;

irradiating the plurality of image beams into a beam-combining means by way of the plurality of reflecting means;

by means of the beam-combining means, combining the plurality of image beams such that their directions of propagation coincide; and by means of the projection means, projecting the combined image beam.

DESCRIPTION OF EMBODIMENTS

Exemplary embodiments of the present invention are next described with reference to the accompanying drawings.

First Exemplary Embodiment

Figure 3:
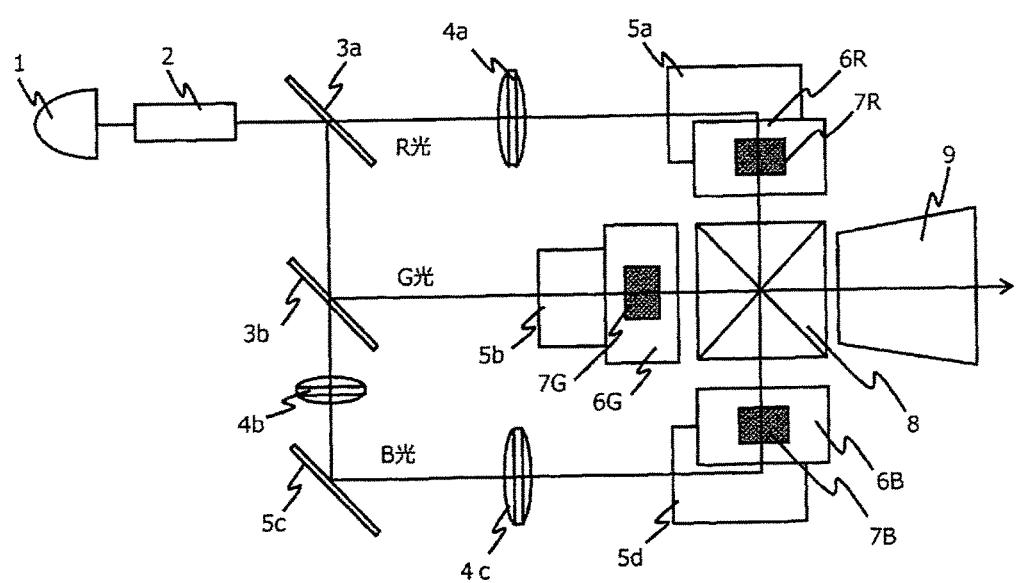
FIG. 3 is a schematic view showing the principal configuration of a projector according to the first exemplary embodiment of the present invention.

FIG. 3 is a schematic view showing the principal configuration of a projector according to the first exemplary embodiment of the present invention.

Referring to FIG. 3, the projector includes white light source 1, light-homogenizing element 2, dichroic mirrors 3a and 3b, lenses 4a-4c, mirrors 5a-5d, Total Internal Reflection (TIR) prisms 6R, 6G, and 6B, DMDs 7R, 7G, and 7B, cross-dichroic prism 8, and projection lens 9.

White light source 1 is a solid-state light source such as an LED (Light Emitting Diode) or a mercury lamp. Light-homogenizing element 2 is a component for supplying DMDs 7R, 7G, and 7B with light in which the shape of the light beam section is rectangular, and moreover, in which the light intensity distribution in a plane perpendicular to the center ray is uniform, and this component can be realized by an optical element such as a rod integrator or a light tunnel. The white light from white light source 1 is irradiated into dichroic mirror 3a via light-homogenizing element 2.

Dichroic mirror 3a transmits light of the red wavelength band and reflects light whose wavelength is shorter than the red wavelength band. Dichroic mirror 3a separates white light into red light and green-blue light. The red light that is transmitted through dichroic mirror 3a is irradiated into DMD 7R via lens 4a, mirror 5a and TIR prism 6R. The green-blue light that is reflected by dichroic mirror 3a is irradiated into dichroic mirror 3b.

Dichroic mirror 3b transmits light of the blue wavelength band and reflects light whose wavelength band is longer than the blue wavelength band. Dichroic mirror 3b separates the green-blue light from dichroic mirror 3a into blue light and green light. The green light that is reflected by dichroic mirror 3b is irradiated into DMD 7G by way of mirror 5b and TIR prism 6G. The blue light that is transmitted through dichroic mirror 3b is irradiated into DMD 7B by way of lenses 4b and 4c, mirrors 5c and 5d, and TIR prism 6B.

Figure 4:
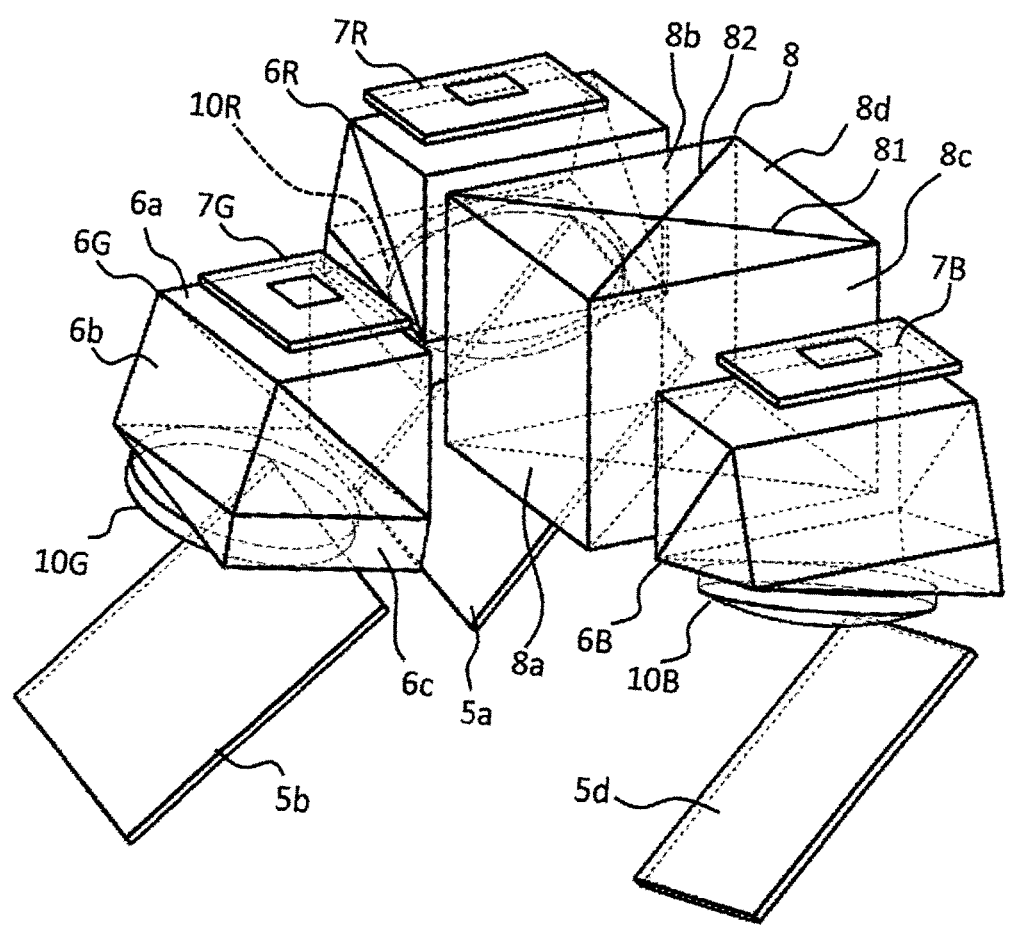
FIG. 4 is a perspective view showing the arrangement of the TIR prisms, the DMDs, and the cross-dichroic prism of the projector shown in FIG. 3.

FIG. 4 gives a schematic representation of the arrangement of mirrors 5a, 5b, and 5d, TIR prisms 6R, 6G, and 6B, DMDs 7R, 7G, and 7B, and cross-dichroic prism 8.

Figure 1:
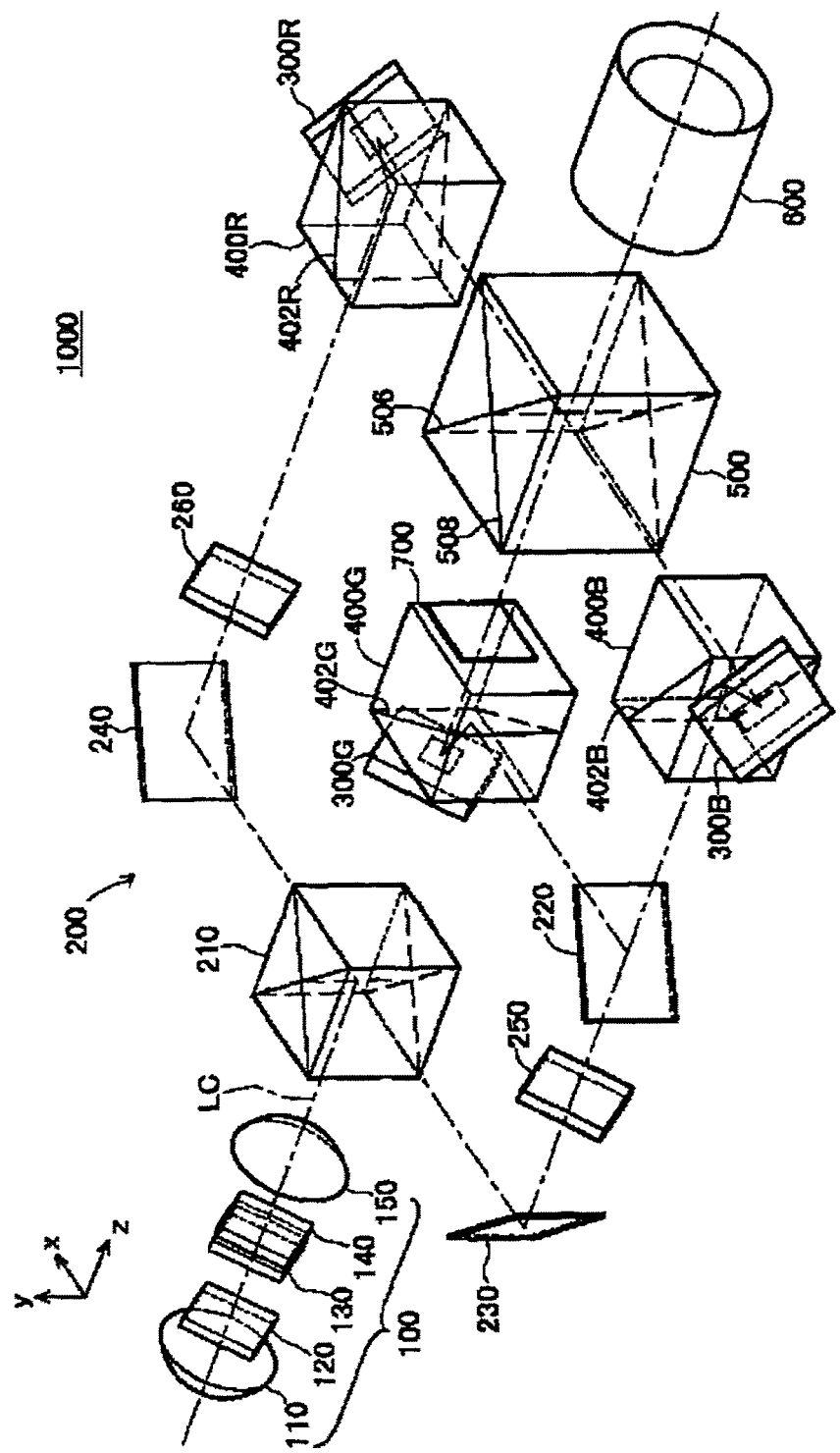
FIG. 1 is a schematic perspective view showing the principal parts of the projection-type display device described in Patent Document 1.
Figure 2:
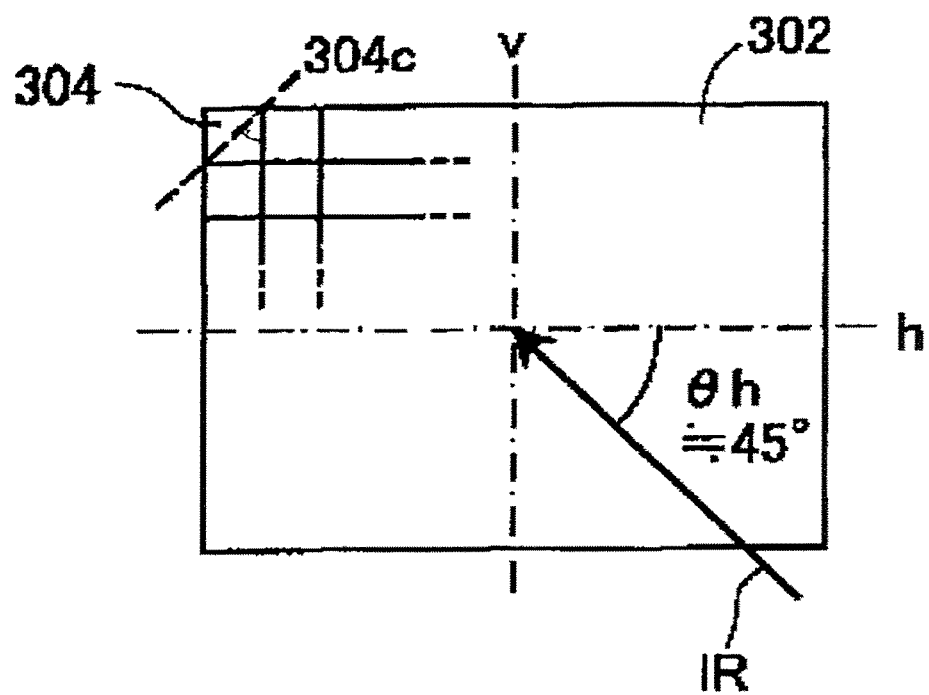
FIG. 2 is a schematic view for describing the relation between the image-forming surfaces of the DMDs and incident light in the projection-type display device shown in FIG. 1.

Each of DMDs 7R, 7G, and 7B includes an image-forming surface made up of a plurality of micromirrors, and for example, includes the image-forming surface such as are shown in FIG. 2. DMDs 7R, 7G, and 7B are arranged such that their image-forming surfaces are arranged in the same plane. In addition, the image-forming surfaces of DMDs 7R, 7G, and 7B are oriented in the same direction. In each of DMDs 7R, 7G, and 7B, each micromirror is configured such that its angle changes according to the drive voltage. The reflecting angle, when a drive voltage that indicates that the ON state is supplied, is different from the reflecting angle when a drive voltage that indicates that the OFF state is supplied. An incident light beam is spatially modulated to form an image by performing the ON/OFF control of each micromirror according to an image signal.

TIR prisms 6R, 6G, and 6B are all polyhedral prisms in which a plurality of prisms are combined. Because TIR prisms 6R, 6G, and 6B all have the same configuration, their configuration is here described by taking TIR prism 6G as an example.

TIR prism 6G includes three prisms 6a-6c. Prisms 6a-6c are all triangular prisms, and from among these prisms, prism 6a is a right-angle prism in which the shape of the base is a right triangle. The side surface that makes up the base of the right triangle of prism 6a and the side surface that makes up the base of the triangle of prism 6b are of substantially the same size, and prisms 6a and 6b are arranged such that these side surfaces face each other with a gap (air layer) interposed. The side surfaces of prisms 6a and 6b that face each other make up the total internal reflection surface of TIR prism 6G.

The shape of the base of prism 6c is a triangle having an acute apical angle. One of the side surfaces that make up the apical angle of the triangle of prism 6c and one of the side surfaces that make up the apical angle of the triangle of prism 6b have substantially the same size, and these side surfaces are joined together.

The other side surface that makes up the apical angle of the triangle of prism 6c is the incident surface of TIR prism 6G. Of the two side surfaces that make up the apical angle of the right triangle of prism 6a, one side surface is the emission surface of TIR prism 6G, and the other side surface is the incident/emission surface of TIR prism 6G. TIR prism 6G is arranged such that its incident surface is positioned on the side of mirror 5b, its emission surface is positioned on the side of cross-dichroic prism 8, and its incident/emission surface is positioned on the side of DMD 7G. Further, TIR prism 6G may be formed by two of prism 6a and prism 6b. In addition, prisms 6b and 6c may be a polyhedron composed of a single prism, and this polyhedron and prism 6a may form TIR prism 6G.

Figure 5:
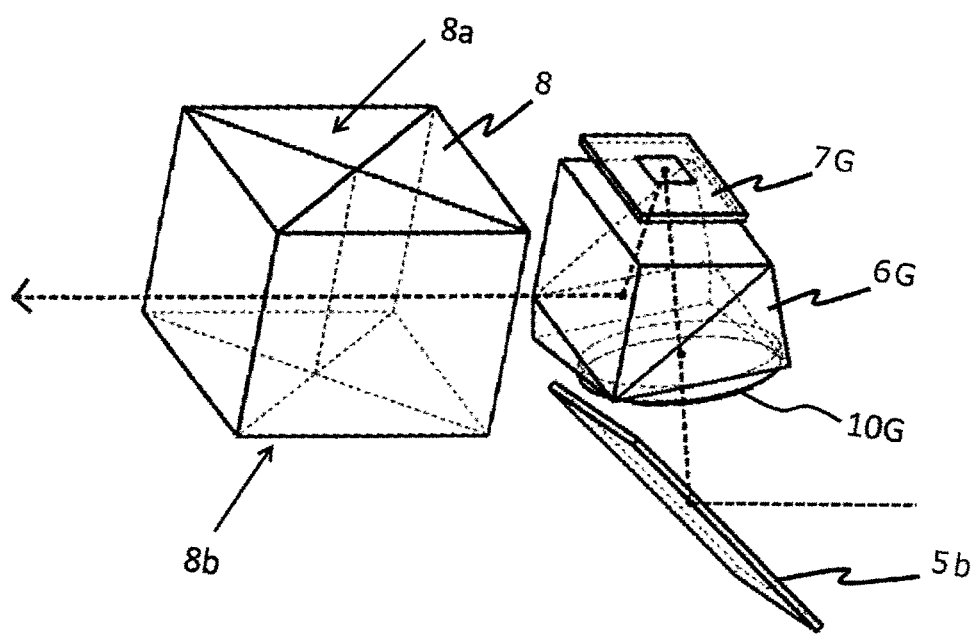
FIG. 5 is a schematic view showing the green optical path that irradiates the cross-dichroic prism in the projector shown in FIG. 3.

FIG. 5 is a schematic view showing the optical path of green light. In FIG. 5, the arrow indicated by broken lines is the optical path of green light. In the interest of convenience, only the center ray of the green optical path is shown.

As shown in FIG. 5, the green light from mirror 5b is supplied to the incident surface of TIR prism 6G by way of field lens 10G. In TIR prism 6G, the green light that is irradiated into the prism from the incident surface irradiates the total internal reflection surface at an angle of incidence that is smaller than the critical angle. As a result, the green light from mirror 5d is transmitted through the total internal reflection surface and emitted toward DMD 7G from the incident/emission surface.

The green light (image beam) from DMD 7G is supplied to the incident/emission surface of TIR prism 6G. In TIR prism 6G, the green light that is irradiated into the prism from the incident/emission surface is irradiated into the total internal reflection surface at an angle of incidence that is equal to or greater than the critical angle. As a result, the green light from DMD 7G is reflected by the total internal reflection surface and emitted toward dichroic prism 8 from the emission surface.

TIR prism 6R has the same construction as TIR prism 6G. The red light from mirror 5a is supplied to the incident surface of TIR prism 6R by way of field lens 10R. In TIR prism 6R, the red light that is irradiated into the prism from the incident surface is incident to the total internal reflection surface at an angle of incidence that is smaller than the critical angle. As a result, the red light from mirror 5a is transmitted through the total internal reflection surface and emitted toward DMD 7R from the incident/emission surface.

The red light (image beam) from DMD 7R is supplied to the incident/emission surface of TIR prism 6R. In TIR prism 6R, the red light that is irradiated into the prism from the incident/emission surface is incident to the total internal reflection surface at an angle of incidence that is equal to or greater than the critical angle. As a result, the red light from DMD 7R is reflected by the total internal reflection surface and emitted toward dichroic prism 8 from the emission surface.

TIR prism 6B also has the same construction as TIR prism 6R. Blue light from mirror 5d is supplied to the incident surface of TIR prism 6B by way of field lens 10B. In TIR prism 6B, the blue light that is irradiated into the prism from the incident surface is incident to the total internal reflection surface at an angle of incidence that is less than the critical angle. As a result, the blue light from mirror 5d is transmitted through the total internal reflection surface and emitted toward DMD 7B from the incident/emission surface.

The blue light (image beam) from DMD 7B is supplied to the incident/emission surface of TIR prism 6B. In TIR prism 6B, the blue light that is irradiated into the prism from the incident/emission surface is incident to the total internal reflection surface at an angle of incidence that is equal to or greater than the critical angle. As a result, the blue light from DMD 7B is reflected by the total internal reflection surface and emitted toward dichroic prism 8 from the emission surface.

Figure 6:
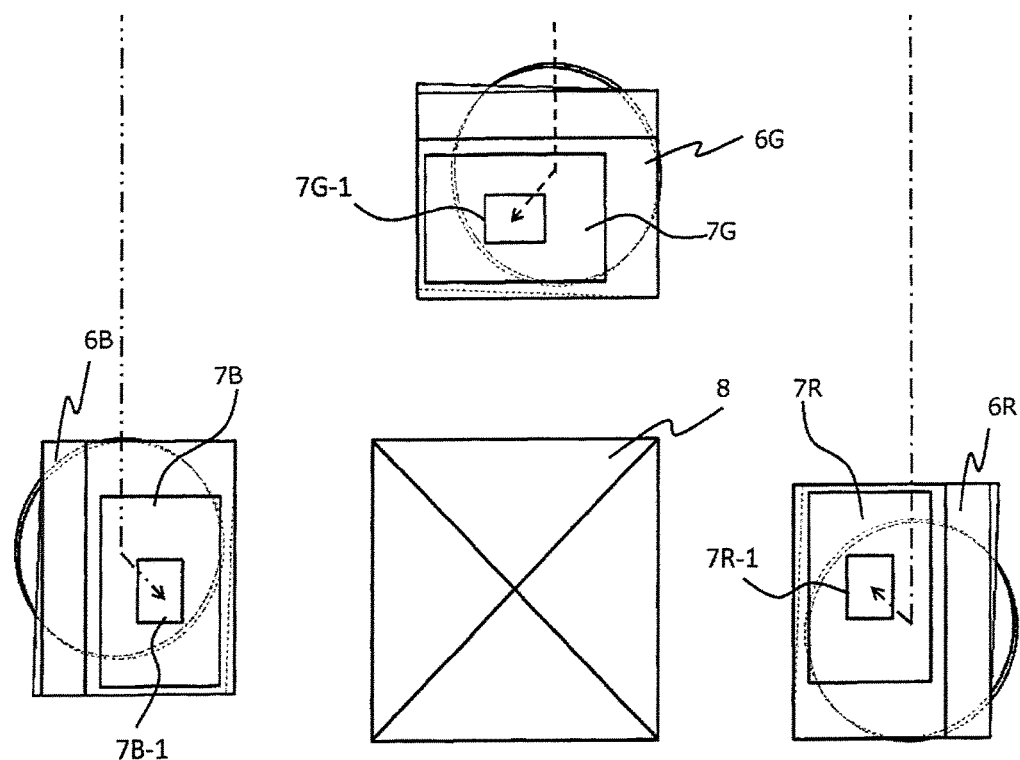
FIG. 6 is a schematic view for describing the direction of incidence of incident light with respect to each DMD when the TIR prisms, DMDs, and cross-dichroic prism shown in FIG. 4 are viewed from above.

FIG. 6 is a schematic view for describing the direction of incidence of each of the red light, green light, and blue light with respect to DMDs 7R, 7G and 7B, respectively, when seen from above. In FIG. 6, the arrow indicated by a broken line is the green light, the arrow indicated by the alternate long and short dash line is the red light, and the arrow indicated by the alternate long and two short dashes line is the blue light. For the sake of convenience, the red light, green light, and blue light are each indicated by only the center light ray. In addition, mirrors 5a, 5b, and 5d are omitted. The bent portions of each of the red light, green light, and blue light indicate reflection by mirrors 5a, 5b, and 5d.

Figure 7:
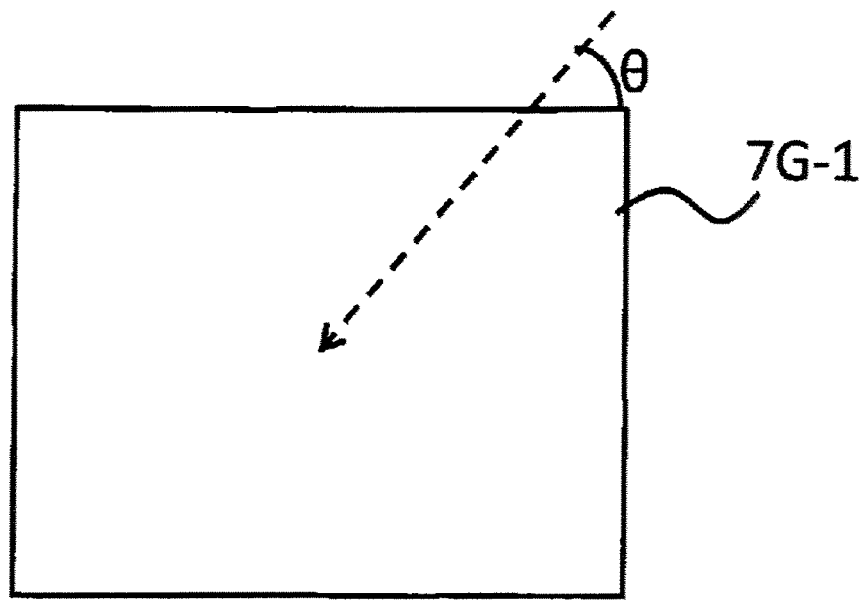
FIG. 7 gives a schematic representation of the direction of incidence of green light to an image-forming surface of a DMD.

FIG. 7 is a schematic representation of the directions of incidence of green light to image-forming surface 7G-1 of DMD 7G shown in FIG. 6. In FIG. 7, the arrow indicated by a broken line is the center ray of the green light.

As shown in FIG. 7, the green light is incident from the diagonally upper right direction to image-forming surface 7G-1 at angle $\theta$. Angle $\theta$ is here the angle that is formed between the green light (center light ray) and the long sides of image-forming surface 7G-1 when seen from a direction perpendicular to image-forming surface 7G-1. Angle $\theta$ is approximately 45 degrees. In DMDs 7R and 7B, the incident light (red light and blue light) is similarly incident to the image-forming surface from a diagonally upper-right direction at angle $\theta$ ($\cong$45 degrees). In this way, there is a limitation ($\theta\cong$45 degrees) on the direction of incidence in DMDs 7R, 7G, and 7B.

As shown in FIGS. 4 and 6, DMDs 7R, 7G, and 7B are arranged such that their image-forming surfaces 7R-1, 7G-1, and 7B-1 are positioned in the same plane. In consideration of the above-described limitation of the direction of incidence ($\theta\cong$45 degrees), DMDs 7R, 7G, and 7B are arranged such that the lower edge of each of image-forming surfaces 7R-1, 7G-1, and 7B-1 is positioned on the side of dichroic prism 8. In this way, the red light, green light, and blue light that are supplied to mirrors 5a, 5b, and 5d, respectively, can be supplied from the same direction. In other words, the incident light (red light, green light, and blue light) can be irradiated into the DMDs by optical paths (lighting optical system) that are the same as in the prior art and increased complexity of the device is therefore avoided. Here, the lower edge of the image-forming surface refers to the lower edge (on the side opposite the side to which incident light is irradiated) of image-forming surface 7G-1 shown in FIG. 7.

Dichroic prism 8 includes four right-angle prisms 8a-8d of substantially the same size. Each of right-angle prisms 8a-8d is a triangular prism in which the shape of the base surface is a right triangle and that has first and second side surfaces that form the apical angle of the right triangle and a third side surface that makes up the base.

The first side surface of right-angle prism 8a is joined with the second side surface of right-angle prism 8b, and the second side surface of right-angle prism 8a is joined to the first side surface of right-angle prism 8c. The first side surface of right-angle prism 8d is joined to the second side surface of right-angle prism 8c, and the second side surface of right-angle prism 8d is joined to the first side surface of right-angle prism 8b.

A uniform surface is formed by the interface of the first side surface of right-angle prism 8a and the second side surface of right-angle prism 8b and the interface of the first surface of right-angle prism 8d and the second surface of right-angle prism 8c, and dichroic film 81 is formed on this surface. Dichroic film 81 has the characteristic of reflecting light of the red wavelength band and transmitting light of other wavelength bands (including the blue and green wavelength bands) in the visible light band.

A uniform surface is formed by the interface of the second side surface of right-angle prism 8a and the first side surface of right-angle prism 8c and the interface of the first side surface of right-angle prism 8b and the second side surface of right-angle prism 8d, and dichroic film 82 is formed on this surface. Dichroic film 82 has the characteristic of reflecting light of the blue wavelength band and transmitting light of other wavelength bands (including the red and green wavelength bands) in the visible light band.

The third side surfaces of each of right-angle prisms 8a, 8b, and 8c are the first, second, and third incident surfaces, respectively, of dichroic prism 8. The third side surface of right-angle prism 8d is the emission surface of dichroic prism 8. Of the first to third incident surfaces of dichroic prism 8, the first incident surface faces the emission surface of TIR prism 6G, the second incident surface faces the emission surface of TIR prism 6R, and the third incident surface faces the emission surface of TIR prism 6B. In addition, dichroic prism 8 includes upper surface 8e and base surface 8f that are perpendicular to each incident surface.

The green image beam from DMD 7G is supplied to the first incident surface of dichroic prism 8 by way of TIR prism 6G. The red image beam from DMD 7R is supplied to the second incident surface of dichroic prism 8 by way of TIR prism 6R. The blue image beam from DMD 7B is supplied to the third incident surface of dichroic prism 8 by way of TIR prism 6B.

In dichroic prism 8, the green image beam that is irradiated from the first incident surface is transmitted through dichroic films 81 and 82 and emitted toward projection lens 9 from the emission surface. The red image beam that is irradiated from the second incident surface is reflected by dichroic film 81 and emitted toward projection lens 9 from the emission surface. The blue image beam that is irradiated from the third incident surface is reflected by dichroic film 82 and emitted toward projection lens 9 from the emission surface. Essentially, dichroic prism 8 combines the red image beam, green image beam, and blue image beam such that the images are superposed on each other and supplies this color-combined image beam to projection lens 9. In other words, dichroic prism 8 causes the direction of propagation of each of the red image beam, green image beam, and blue image beam to coincide. The positional relation between dichroic prism 8 and DMDs 7R, 7G, 7B is next described. The image-forming surfaces of each of DMDs 7R, 7G, and 7B are parallel to upper surface 8e or base surface 8f of dichroic prism 8. In addition, DMDs 7R, 7G, and 7B are arranged such that their image-forming surfaces are parallel to a plane that is perpendicular to one or both dichroic film 81 and dichroic film 82.

The green image beam from DMD 7G is transmitted through dichroic prism 8 without alteration and is irradiated into projection lens 9. On the other hand, the red image beam from DMD 7R and the blue image beam from DMD 7B are reflected one time in dichroic prism 8, and the reflected light is then irradiated into projection lens 9. As a result, the green image that is formed by DMD 7G and the red image and blue image that are formed by DMDs 7R and 7B are in a relation in which the right and left of the images are inverted. Projection lens 9 enlarges and projects the color-combined image beam from dichroic prism 8 upon a screen. The screen may be of any form that allows the projection of an image, and for example, may be a structure such as a wall. In the image beam that is enlarged and projected upon the screen, the red image beam, green image beam, and blue image beam are superposed such that their long sides and each of their picture elements coincide to together form a single color image. Projection lens 9 may be a compound projection optical system in which mirrors and lenses are combined.

The projector of the present exemplary embodiment exhibits the following action and effects.

As shown in FIGS. 4 and 6, DMDs 7R, 7G and 7B are arranged such that their image-forming surfaces 7R-1, 7G-1 and 7B-1 are positioned in the same plane. Image-forming surface 7G-1 is orthogonal to the first incident surface of dichroic prism 8, and the long sides of image-forming surface 7G-1 are parallel to the first incident surface. Image-forming surface 7R-1 is orthogonal to the second incident surface of dichroic prism 8, and the long sides of image-forming surface 7R-1 are parallel to the second incident surface. Image-forming surface 7B-1 is orthogonal to the third incident surface of dichroic prism 8, and the long side of image-forming surface 7B-1 is parallel to the third incident surface.

According to the above-described configuration, the long sides of image-forming surfaces 7R-1 and 7B-1 are parallel, and the red image formed by image-forming surface 7R-1 and the blue image formed by image-forming surface 7B-1 are combined by dichroic prism 8 such that the long sides coincide. Further, the long sides of image-forming surface 7G-1 are orthogonal to image-forming surfaces 7R-1 and 7B-1, whereby the green image formed by image-forming surface 7G-1 is combined with the red image and blue image formed by image-forming surfaces 7R-1 and 7B-1 by dichroic prism 8 such that the long sides coincide.

In addition, the long sides of the projected images of each of the red image, green image, and blue image that are formed by image-forming surfaces 7R-1, 7G-1, and 7B-1 substantially coincide with the horizontal direction, thereby eliminating the need for countermeasures such as tilting the optical unit that includes optical elements from light source 1 to dichroic prism 8 (or projection lens 9) diagonally.

Still further, the above-described optical unit can be made more compact because the red light, green light, and blue light can be supplied to DMDs 7R, 7G, and 7B from the same side, as shown in FIG. 6, and the need for providing a detour optical path is eliminated. In addition, because each element of the optical system (such as mirrors and lenses) from light source 1 to mirrors 5a, 5b, and 5d can be arranged on the same plane, the above-described optical unit can be made even more compact.

Second Exemplary Embodiment

The projector of the present exemplary embodiment has the same configuration as the first exemplary embodiment, but the arrangement of DMD 7G differs from that of the first exemplary embodiment.

Figure 8A:
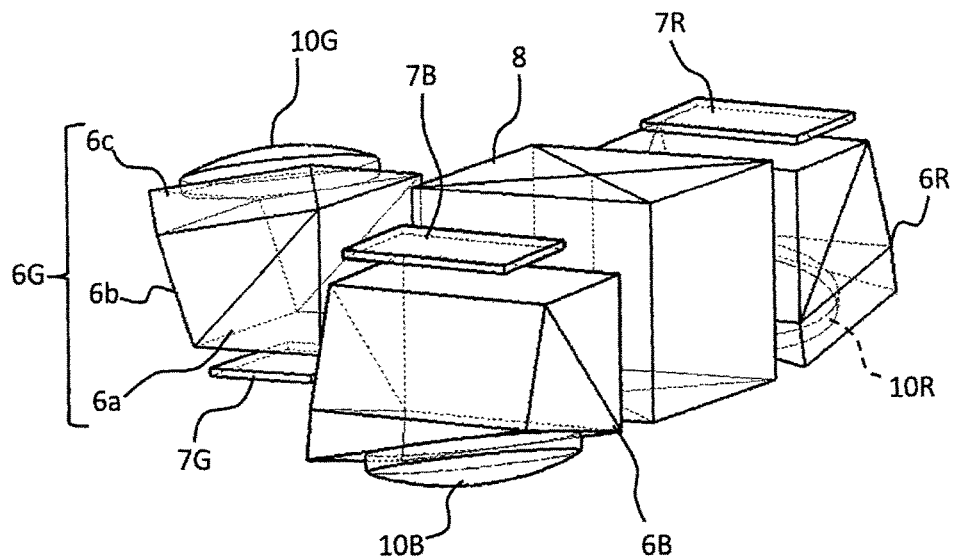
FIG. 8A is a perspective view giving a schematic representation of the arrangement of the TIR prisms, DMDs, and cross-dichroic prism when the projector according to the second exemplary embodiment of the present invention is viewed from above.
Figure 8B:
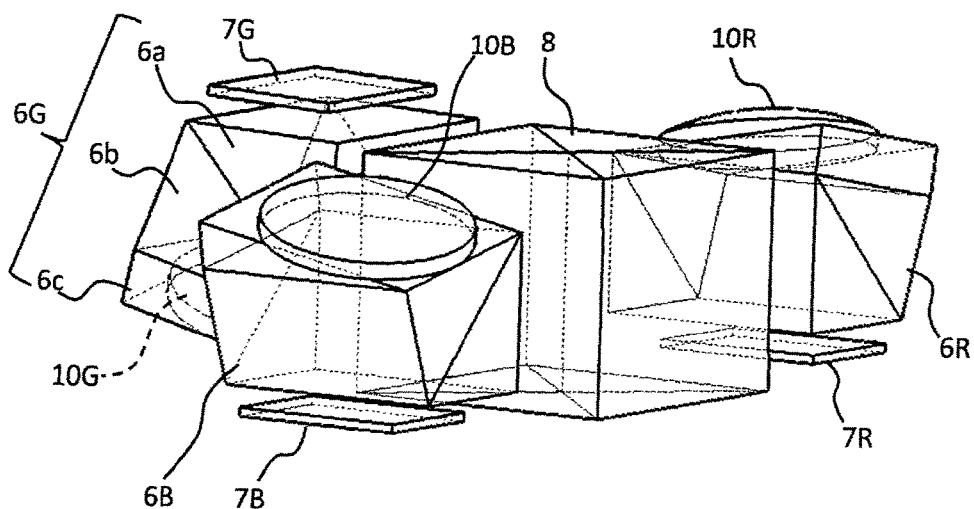
FIG. 8B is a perspective view giving a schematic representation of the TIR prisms, DMDs, and cross-dichroic prism when the projector according to the second exemplary embodiment of the present invention is viewed from below.

FIGS. 8A and 8B give schematic representations of the arrangement of TIR prisms 6R, 6G, and 6B, DMDs 7R, 7G, and 7B, and cross-dichroic prism 8. FIG. 8A is a perspective view as viewed from the upper side, and FIG. 8B is a perspective view as viewed from the lower side.

As shown in FIGS. 8A and 8B, DMD 7R and DMD 7B are arranged such that their image-forming surfaces are positioned on the same plane, and DMD 7G and DMD 7R (or DMD 7B) are arranged such that their image-forming surfaces are parallel to each other. Although not shown in the figures, DMDs 7R, 7G, and 7B each have image-forming surfaces 7R-1, 7G-1, and 7B-1 that were described in the first exemplary embodiment.

DMDs 7R and 7B and cross-dichroic prism 8 are arranged as shown in FIG. 4, and image-forming surface 7R-1 of DMD 7R and image-forming surface 7B-1 of DMD 7B are both arranged on the upper surface side of cross-dichroic prism 8. Image-forming surface 7R-1, image-forming surface 7B-1, and the upper surface of cross-dichroic prism 8 may here be arranged to be positioned on the same plane. In other words, the image-forming surfaces of each of DMDs 7R and 7B are parallel with upper surface 8e of dichroic prism 8.

On the other hand, image-forming surface 7G-1 of DMD 7G is positioned on the base surface side of cross-dichroic prism 8. Image-forming surface 7G-1 and the base surface of cross-dichroic prism 8 may here be arranged to be positioned on the same plane. The image-forming surface of DMD 7G is parallel with base surface 8f of dichroic prism 8.

In addition, the image-forming surfaces of each of DMDs 7R, 7B, and 7G are arranged to be parallel to a plane that is perpendicular to one or both dichroic film 81 and dichroic film 82.

In other words, the image-forming surfaces of DMDs 7R, 7B, and 7G are arranged perpendicular to one or both dichroic film 81 and dichroic film 82.

TIR prisms 6R, 6G, and 6B have the same configuration (prisms 6a-6c) as in the first exemplary embodiment, but TIR prism 6G is arranged with its top and bottom opposite those of TIR prisms 6R and 6B. In other words, the incident surface of TIR prism 6G is positioned on the upper surface side of cross-dichroic prism 8, and the incident surfaces of TIR prisms 6R and 6B are positioned on the base surface side of cross-dichroic prism 8. Although not shown in FIGS. 8A and 8B, mirrors 5a and 5d are arranged on the base surface side of cross-dichroic prism 8, and mirror 5b is arranged on the upper surface side of cross-dichroic prism 8. Image-forming surface 7G-1 of DMD 7G is orthogonal to the first incident surface of dichroic prism 8, and the long sides of image-forming surface 7G-1 are parallel to the first incident surface. Image-forming surface 7R-1 of DMD 7R is orthogonal to the second incident surface of dichroic prism 8, and the long sides of image-forming surface 7R-1 are parallel to the second incident surface. Image-forming surface 7B-1 is orthogonal to the third incident surface of dichroic prism 8, and the long sides of image-forming surface 7B-1 are parallel to the third incident surface.

According to the above-described configuration, because the long sides of image-forming surfaces 7R-1 and 7B-1 that are arranged on the same plane are parallel to each other, the red image that is formed by image-forming surface 7R-1 and the blue image that is formed by image-forming surface 7B-1 are combined by dichroic prism 8 such that their long sides coincide.

In addition, image-forming surface 7G-1 is parallel to image-forming surfaces 7R-1 and 7B-1, and the long sides of image-forming surface 7G-1 are orthogonal to the long sides of image-forming surfaces 7R-1 and 7B-1. As a result, the green image formed by image-forming surface 7G-1 is combined with the red image and blue image that are formed by image-forming surfaces 7R-1 and 7B-1 by dichroic prism 8 such that their long sides coincide.

In addition, the long sides of the projected images of each of the red image, green image, and blue image that are formed by image-forming surfaces 7R-1, 7G-1, and 7B-1 substantially coincide with the horizontal direction, whereby the need is eliminated for a countermeasure such as diagonally tilting the optical unit that contains the optical elements from light source 1 to dichroic prism 8 (or projection lens 9).

Still further, red light, green light, and blue light can be supplied to DMDs 7R, 7G, and 7B from the same direction as shown in FIG. 6, thus eliminating the need for providing a detour optical path, and the above-described optical unit can therefore be made more compact.

Third Exemplary Embodiment

Figure 9:
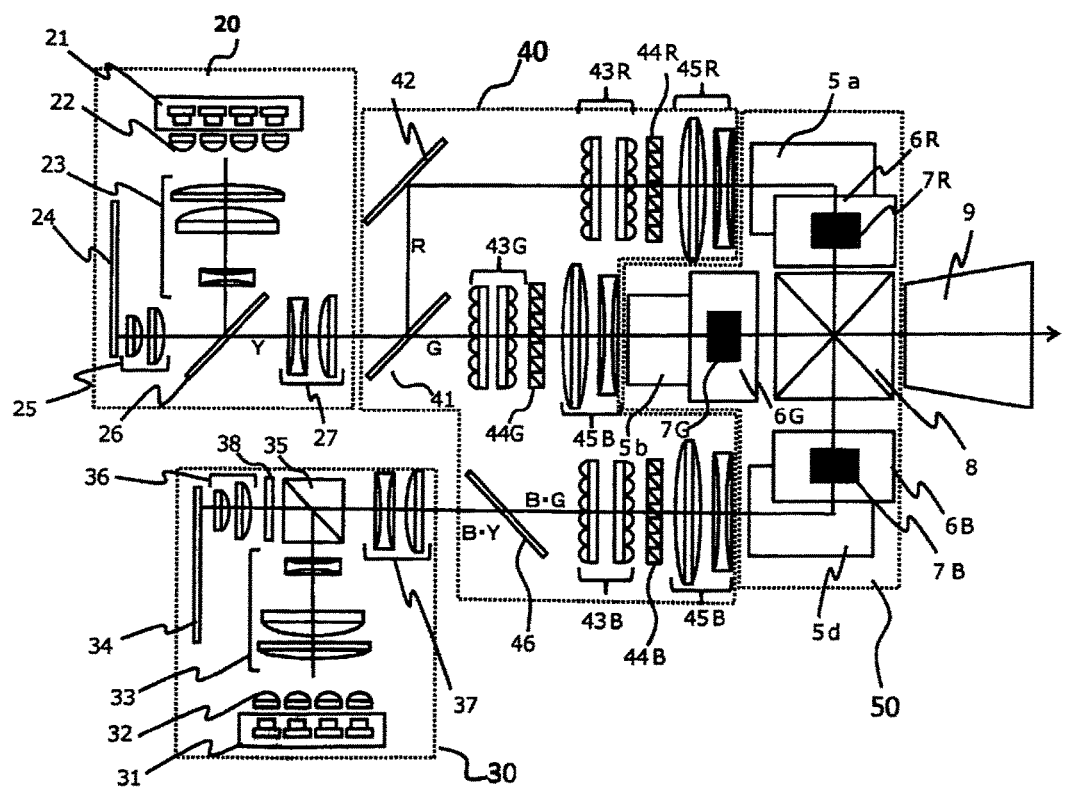
FIG. 9 is a schematic view showing the principal configuration of the projector according to the third exemplary embodiment of the present invention.

FIG. 9 is a schematic view showing the principal configuration of a projector according to the third exemplary embodiment of the present invention.

Referring to FIG. 9, the projector includes light source units 20 and 30, lighting unit 40, image forming/combining unit 50, and projection lens 9.

Light source unit 20 includes a plurality of blue lasers 21, a plurality of collimator lenses 22, dichroic mirror 26, lens groups 23, 25, and 27, and phosphor unit 24. Collimator lens 22 is provided for each blue laser 21, and excitation light supplied from each blue laser 21 is converted to parallel luminous flux by each corresponding collimator lens 22. The number of blue lasers 21 can be increased or decreased as necessary.

Lens group 23 reduces the luminous flux diameter of the excitation light (pseudo-parallel light) from each blue laser 21. By decreasing the emitted luminous flux diameter to less than the incident luminous flux diameter, the size of parts arranged after lens group 23 can be made smaller.

The excitation light emitted from lens group 23 is irradiated into dichroic mirror 26 at an angle of incidence of approximately 45 degrees. Dichroic mirror 26 reflects light of the blue wavelength band and transmits light whose wavelength band (including the yellow wavelength band) is longer than the blue wavelength band. The excitation light from lens group 23 is reflected by dichroic mirror 26, and the reflected light is condensed upon the phosphor wheel of phosphor unit 24 by lens group 25.

The phosphor wheel is a component in which a yellow phosphor region that contains a phosphor that produces yellow fluorescent light is formed over the entire circumference on a disk-shaped reflective mirror. By rotating the phosphor wheel by means of a drive unit (motor) that is not shown in the figures, the spot of the excitation light from dichroic mirror 26 moves in the circumferential direction on the yellow phosphor region. Excitation of the phosphor by the excitation light causes the emission of yellow fluorescent light from the phosphor. This yellow fluorescent light contains light of wavelength regions from green to red.

The yellow fluorescent light from the yellow phosphor region irradiates dichroic mirror 26 by way of lens group 25. The yellow fluorescent light is transmitted through dichroic mirror 26. The yellow fluorescent light that is transmitted through dichroic mirror 26 is supplied to lighting unit 40 by way of lens group 27.

Light source unit 30 includes a plurality of blue lasers 31, a plurality of collimator lenses 32, phosphor unit 34, prism 35, lens groups 33, 36, and 37, and quarter-wave plate 38.

Collimator lens 32 is provided for each blue laser 31, and the excitation light supplied from each blue laser 31 is converted to parallel luminous flux by each corresponding collimator lens 32. The number of blue lasers 31 can be increased or decreased as necessary.

Lens group 33 reduces the luminous flux diameter of the excitation light (pseudo-parallel light) from each blue laser 31. By making the emitted luminous flux diameter smaller than the incident luminous flux diameter, the size of components that are arranged after lens group 33 can be made smaller.

The excitation light emitted from lens group 33 is irradiated upon the internal reflecting film of prism 35 at an angle of incidence of approximately 45 degrees. The internal reflecting film has the characteristic of transmitting, of visible light, light of wavelength bands other than the wavelength band of blue light (including the yellow band), and for the blue wavelength band, reflecting p-polarized light and transmitting s-polarized light. The blue excitation light from blue lasers 31 is irradiated upon the internal reflecting film of prism 35 as p-polarized light, whereby the blue excitation light is reflected by the internal reflecting film.

The blue light (p-polarized light) that is the reflected light from the internal reflecting film of prism 35 is transmitted through quarter-wave plate 38 and thus converted to circularly polarized light and then condensed upon the phosphor wheel of phosphor unit 34 by lens group 36. The phosphor wheel is provided with a disk-shaped reflecting mirror, and this reflecting mirror is divided in the circumferential direction into first and second segments. A yellow phosphor region that contains a phosphor that emits yellow fluorescent light is formed on the first segment, and a reflecting surface is formed on the second segment.

By rotating the phosphor wheel by a drive unit (motor) not shown in the figures, the blue light (circularly polarized light) from lens group 36 is sequentially irradiated upon the first and second segments. In the first segment, the phosphor that is excited by the blue light (circularly polarized light) emits yellow fluorescent light (containing light of the wavelength range from green to red). In the second segment, the blue light (circularly polarized light) is reflected.

The yellow fluorescent light from the first segment and the blue light (circularly polarized light) that is the reflected light from the second segment are sequentially transmitted through lens group 36 and quarter-wave plate 38. The blue light (circularly polarized light) from the second segment is here converted to s-polarized light by transmitting through quarter-wave plate 38. Each of the yellow fluorescent light and blue light (s-polarized light) are transmitted through the internal reflecting film of prism 35 and supplied to lighting unit 40 by way of lens group 37.

Lighting unit 40 includes color filters 41 and 46, mirror 42, integrators 43R, 43G, and 43B, polarization conversion elements 44R, 44G, and 44B, and lens groups 45R, 45G, and 45B.

The yellow fluorescent light (center light ray) from light source unit 20 irradiates color filter 41 at an angle of incidence of approximately 45 degrees. Color filter 41 has the characteristic of reflecting, of visible light, light of the red wavelength band and transmitting light of the green wavelength band. Of the yellow fluorescent light from light source unit 20, the red light is reflected by color filter 41, and the green light is transmitted through color filter 41.

The red light that is the reflected light from color filter 41 irradiates integrator 43R by way of mirror 42. Integrator 43R is a light-homogenizing element and includes first and second lens arrays. The incident red light is divided into a plurality of partial light beams by the first lens array. The second lens array is configured to superpose each of the partial light beams from the first lens array upon the image-forming surfaces of DMD 7R.

The red partial light beams from integrator 43R are converted to s-polarized red partial light beams by polarization conversion element 44. The red partial light beams (s-polarized light) from polarization conversion element 44R are supplied to image forming/combining unit 50 by way of lens group 45R.

The green light that is the transmitted light from color filter 41 irradiates integrator 43G. Integrator 43G is also a light-homogenizing element of the same configuration as integrator 43R. The green light is divided into a plurality of partial light beams by the first lens array, and each partial light beam is superposed upon the image-forming surfaces of DMD 7G by the second lens array.

The green partial light beams from integrator 43G are converted to p-polarized green partial light beams by polarization conversion element 44G. The green partial light beams (p-polarized light) from polarization conversion element 44 are supplied to image-forming/combining unit 50 by way of lens group 45G.

The yellow fluorescent light and blue light from light source unit 30 irradiate color filter 46 at an angle of incidence of approximately 45 degrees. Color filter 46 has the characteristic of transmitting, of visible light, light of the blue wavelength band and light of the green wavelength band and reflecting or absorbing light of other wavelength bands.

The blue light and the green light of the yellow fluorescent light are transmitted through color filter 46. The blue light and green light that are the transmitted light from color filter 46 irradiate integrator 43B. Integrator 43B is also a light-homogenizing element of the same configuration as integrator 43R. The blue light and green light are each divided into a plurality of partial light beams by the first lens array, and the partial light beams are each superposed upon the image-forming surfaces of DMD 7B by the second lens array.

The partial light beams of the blue light and green light from integrator 43B are converted to s-polarized partial light beams by polarization conversion element 44B. The partial light beams (s-polarized light) of each of the blue light and green light from polarization conversion element 44G are supplied to image-forming/combining unit 50 by way of lens group 45B. Image-forming/combining unit 50 includes mirrors 5a, 5b, and 5d, TIR prisms 6R, 6G, and 6B, DMDs 7R, 7G, and 7B, and dichroic prism 8, and these optical elements are basically the same as the components described in the first or second exemplary embodiment. However, the spectral transmission characteristics of dichroic films 81 and 82 of dichroic prism 8 differ from those of the first or second exemplary embodiment. For the sake of convenience, lenses 10R, 10G, and 10B that were shown in FIG. 4 have been omitted from FIG. 9.

Dichroic film 81 has the characteristic of, for s-polarized light, transmitting light of the blue and green wavelength bands and reflecting light of the red wavelength band, and for p-polarized light, transmitting light of at least the green wavelength band. Dichroic film 82 has the characteristic of, for s-polarized light, reflecting light of the blue and green wavelength bands and transmitting light of the red wavelength band, and for p-polarized light, transmitting light of at least the green wavelength band.

The green light (p-polarized light) from lens group 45G is irradiated upon the image-forming surfaces of DMD 7G by way of mirror 5b and TIR prism 6G. DMD 7G forms a green image based on a green video signal. The green image beam (p-polarized light) from DMD 7G is supplied to the first incident surface of dichroic prism 8 by way of TIR prism 6G.

The red light (s-polarized light) from lens group 45R is irradiated upon the image-forming surfaces of DMD 7R by way of mirror 5a and TIR prism 6R. DMD 7R forms a red image based on a red video signal. The red image beam (s-polarized light) from DMD 7R is supplied to the second incident surface of dichroic prism 8 by way of TIR prism 6R.

The green light (s-polarized light) and blue light (s-polarized light) from lens group 45B are irradiated upon the image-forming surface of DMD 7B by way of mirror 5d and TIR prism 6B. The irradiation of the green light (s-polarized light) and blue light (s-polarized light) upon the image-forming surface is here carried out by time division. For example, a one-frame interval is divided into first and second intervals, the blue light (s-polarized light) being irradiated upon the image-forming surface in the first interval and the green light (s-polarized light) being irradiated upon the image-forming surface in the second interval. DMD 7B forms a blue image and green image on the basis of a blue video signal in time divisions. The blue image beam (s-polarized light) and green image beam from DMD 7B are supplied to the third incident surface of dichroic prism 8 by way of TIR prism 6B.

In dichroic prism 8, the green image beam (p-polarized light) that is irradiated from the first incident surface is transmitted through dichroic films 81 and 82 and then emitted from the emission surface and toward projection lens 9. The red image beam (s-polarized light) that is irradiated from the second incident surface is reflected by dichroic film 81 and emitted from the emission surface and toward projection lens 9. The blue image beam (s-polarized light) and green image beam (s-polarized light) that are irradiated from the third incident surface are reflected by dichroic film 82 and emitted from the emission surface and toward projection lens 9. In other words, dichroic prism 8 color-combines the green image beam (p-polarized light) from DMD 7G, the red image beam (s-polarized light) from DMD 7R, and the green image beam (s-polarized light) and blue image beam (s-polarized light) from DMD 7B such that their images are superposed on each other and supplies this color-combined image beam to projection lens 9.

In the projector of the present exemplary embodiment as well, DMDs 7R, 7G, and 7B are arranged as described in the first or second exemplary embodiment, and as a result, the same action and effects are exhibited as in the first or second exemplary embodiment. In addition, the superposition of the green image beam from DMD 7B on the green image beam from DMD 7G enables an increase of the luminance of the green image in the projected image and can therefore obtain a high-luminance projected image.

The projectors of each of the above-described exemplary embodiments are only examples of the present invention, and the configuration is open to modifications as appropriate within a scope that does not diverge from the spirit of the invention.

For example, in the first or second exemplary embodiment, a red light source for DMD 7R, a green light source for DMD 7G, and blue light source for DMD 7B may be provided in place of white light source 1. In this case, the red light from the red light source is supplied to DMD 7R by way of mirror 5a and TIR prism 6R, the green light from the green light source is supplied to DMD 7G by way of mirror 5b and TIR prism 6G, and the blue light from the blue light source is supplied to DMD 7B by way of mirror 5d and TIR prism 6B. A light-homogenizing element is arranged on each of the red light path, the green light path, and the blue light path. The need for components such as dichroic mirrors 3*a* and 3*b* is thus eliminated. The red light source, green light source, and blue light source may be solid-state light sources such as LEDs.

In the first or second exemplary embodiment, moreover, a plurality of dichroic mirrors may be used in place of cross-dichroic prism 8. For example, a first dichroic mirror that combines the image beam of two DMDs among DMDs 7R, 7G, and 7B and a second dichroic mirror that combines the image beam of the remaining DMD with the combined image beam from the first dichroic mirror can be used. In this case, the image-forming surfaces of the above-described two DMDs are perpendicular to the first dichroic mirror, and the angle formed by the long sides of the image-forming surfaces and the first dichroic mirror is approximately 45 degrees. The image-forming surface of the remaining DMD is perpendicular to the second dichroic mirror, and the angle formed by the long sides of the image-forming surface and the second dichroic mirror is approximately 45 degrees. The first and second dichroic mirrors may here each have the same characteristics as dichroic films 81 and 82 of cross-dichroic prism 8.

In addition, in the second exemplary embodiment, the image-forming surfaces of DMDs 7R and 7B are arranged on the same plane, but the present invention is not limited to this form. The image-forming surfaces of two DMDs among DMDs 7R, 7G, and 7B may be arranged on the same plane.

Finally, the present invention may adopt the forms as described in the following Supplementary Notes 1-12 but is not limited to these forms.

[Supplementary Note 1]

A projector includes:
a plurality of image-forming means that are each provided with an image-forming surface having a plurality of micromirrors;
a plurality of reflecting means that are provided so as to each reflect respective image beams that are formed by the plurality of image-forming means;
beam-combining means into which the plurality of image beams are irradiated by way of the plurality of reflecting means and that emits a combined image beam in which the plurality of image beams are combined such that their directions of propagation coincide; and
projection means that projects the combined image beam that is emitted by the beam-combining means;
wherein, of the plurality of image forming means, at least two image-forming means are arranged such that their image-forming surfaces are located in the same plane.

[Supplementary Note 2]

In the projector as described in Supplementary Note 1, the plurality of image-forming means are arranged such that the image-forming surface of each image-forming means is parallel to a predetermined plane.

[Supplementary Note 3]

In the projector as described in Supplementary Note 1 or 2:
the beam-combining means includes a plurality of incident surfaces into which respective beams of the plurality of image beams are irradiated, respectively and an emission surface for emitting the combined image beam; and
the plurality of image-forming means are arranged such that the image-forming surface of each image-forming means is perpendicular to the plurality of incident surfaces.

[Supplementary Note 4]

In the projector as described in Supplementary Note 1 or 2,
the plurality of image-forming means include first to third digital micromirror devices; and
the beam-combining means includes:
an emission surface;
a first incident surface into which an image beam of a first color is irradiated from the first digital micromirror device;
a second incident surface into which an image beam of a second color is irradiated from the second digital micromirror device;
a third incident surface into which an image beam of a third color is irradiated from the third digital micromirror device;
a first dichroic film that is configured to: transmit an image beam of the first color that is irradiated from the first incident surface and emit the image beam from the emission surface, reflect an image of the second color that is irradiated from the second incident surface and emit the image beam from the emission surface, and transmit an image beam of the third color that is irradiated from the third incident surface; and
a second dichroic film that is configured to: transmit an image beam of the first color that is irradiated from the first incident surface and emit the image beam from the emission surface, reflect the image of the third color that is irradiated from the third incident surface and emit the image beam from the emission surface, and transmit an image beam of the second color that is irradiated from the second incident surface;
wherein the first digital micromirror device includes a first image-forming surface that is perpendicular to the first incident surface, the long sides of the first image-forming surface being parallel to the first incident surface;
the second digital micromirror device includes a second image-forming surface that is perpendicular to the second incident surface, the long sides of the second image-forming surface being parallel to the second incident surface; and
the third digital micromirror device includes a third image-forming surface that is perpendicular to the third incident surface, the long sides of the third image-forming surface being parallel to the third incident surface.

[Supplementary Note 5]

In the projector as described in Supplementary Note 4, the image beam of the first color is a green image beam, the image beam of the second color is a red image beam, and the image beam of the third color is a blue image beam.

[Supplementary Note 6]

In the projector as described in Supplementary Note 4 or 5, the long sides of the second image-forming surface are parallel to the long sides of the third image-forming surface, and the long sides of the first image-forming surface are perpendicular to the long sides of the second or third image-forming surface.

[Supplementary Note 7]

In the projector as described in any one of Supplementary Notes 2 to 6:
the beam-combining means is a cross-dichroic prism; and
the predetermined plane is at least one of the upper surface or the base surface of the cross-dichroic prism.

[Supplementary Note 8]

In the projector as described in any one of Supplementary Notes 1 to 7, the reflecting means are total reflection prisms.

[Supplementary Note 9]

In the projector as described in Supplementary Note 8, the total reflection prisms are provided with first to third surfaces and a total reflection surface and are configured such that light that is irradiated from the first surface is transmitted through the total reflection surface and emitted from the second surface in the direction of the image-forming surface of a corresponding image-forming means, an image beam from the image-forming surface is irradiated from the second surface, and the irradiated image beam is reflected by the total reflection surface and emitted from the third surface in the direction of the beam-combining means.

[Supplementary Note 10]

A projector has:
a plurality of image-forming means that are each provided with an image-forming surface having a plurality of micromirrors;
a plurality of reflecting means that are provided so as to reflect a plurality of respective image beams that are formed by the plurality of image-forming means;
a cross-dichroic prism into which the plurality of image beams are irradiated by way of the plurality of reflecting means and that emits a combined image beam in which the plurality of image beams are combined such that their directions of propagation coincide; and
projection means that projects the combined image beam that is emitted from the beam-combining means;
wherein, of the plurality of image-forming means, at least two image-forming means are arranged such that the image-forming surface of each image-forming means is positioned parallel to a plane that is perpendicular to a dichroic film of the cross-dichroic prism.

[Supplementary Note 11]

In the projector as described in any one of Supplementary Notes 1 to 10, the image-forming surfaces of the plurality of image forming means are positioned on the same plane and oriented in the same direction.

[Supplementary Note 12]

An image projection method uses a plurality of image-forming means that are each equipped with an image-forming surface having a plurality of micromirrors to project, by means of projection means, an image beam that is formed on the image-forming surfaces, the image projection method including:
arranging, of the plurality of image-forming means, at least two image-forming means such that the image-forming surface of each image-forming means is positioned on the same plane;
by means of a plurality of reflecting means, reflecting each of a plurality of image beams that are formed by the plurality of image-forming means;
irradiating the plurality of image beams into a beam-combining means by way of the plurality of reflecting means;
by means of the beam-combining means, combining the plurality of image beams such that their directions of propagation coincide; and
by means of the projection means, projecting the combined image beam.

In the projector as described in Supplementary Note 1 or Supplementary Note 10 above, each of the plurality of image-forming means, the plurality of reflecting means, the beam-combining means, and the projection means can be realized by DMDs 7R, 7G, and 7B, TIR prisms 6R, 6G, and 6B, dichroic prism 8, and projection lens 9, respectively, in the first or second exemplary embodiment.

According to the above-described projector, at least two image-forming means are arranged such that the image-forming surface of each image-forming means is positioned on the same plane. In this way, the images formed by these image-forming means can be combined by the beam-combining means such that their long sides coincide. For example, when DMDs 7R and 7B are arranged such that image-forming surfaces 7R-1 and 7B-1 of each are positioned in the same plane as shown in FIG. 8A or FIG. 8B, the red image from image-forming surface 7R-1 and the blue image from image-forming surface 7B-1 can be superposed such that their long sides coincide if the long sides of image-forming surfaces 7R-1 and 7B-1 are parallel.

In addition, because light from a light source can be provided to at least two of the image-forming means from the same side, the device can be made more compact than the device described in Patent Document 1 that required a detour light path.

EXPLANATION OF REFERENCE NUMBERS

1 white light source
2 light-homogenizing element
3*a*, 3*b* dichroic mirror
4*a*-4*c* lens
5*a*-5*d* mirror
6R, 6G, 6B TIR prism
7R, 7G, 7B DMD
8 cross-dichroic prism
9 projection lens

The invention claimed is:

1. A projector, comprising:
a plurality of image-forming elements that are each provided with an image-forming surface including a plurality of micromirrors;
a plurality of reflecting elements that are provided so as to reflect respective plurality of image beams that are formed by said plurality of image-forming elements;
a beam-combining element into which said plurality of image beams are irradiated by said plurality of reflecting elements and that emits a combined image beam in which said plurality of image beams are combined such that directions of propagation of said plurality of image beams coincide; and
a projection unit that projects said combined image beam that is emitted by said beam-combining element,
wherein, of said plurality of image forming elements, at least two image-forming elements are arranged such that said image-forming surface of each image-forming element is located in a same plane,
wherein said plurality of image-forming elements include first to third digital micromirror devices, and
wherein said beam-combining element includes:
an emission surface;
a first incident surface into which an image beam of a first color is irradiated from said first digital micromirror device;
a second incident surface into which an image beam of a second color is irradiated from said second digital micromirror device;
a third incident surface into which an image beam of a third color is irradiated from said third digital micromirror device;
a first dichroic film that is configured to transmit an image beam of said first color that is irradiated from said first incident surface and emit the image beam from said emission surface, reflect an image beam of said second color that is irradiated from said second incident surface and emit the image beam from said emission surface, and transmit an image beam of said third color that is irradiated from said third incident surface; and
a second dichroic film that is configured to transmit an image beam of said first color that is irradiated from said first incident surface and emit the image beam from said emission surface, reflect an image beam of said third color that is irradiated from said third incident surface and emit the image beam from said emission surface, and transmit an image beam of said second color that is irradiated from said second incident surface.

2. The projector as set forth in claim 1, wherein said plurality of image-forming elements are arranged such that the image-forming surface of each image-forming element is parallel to a predetermined plane.

3. The projector as set forth in claim 2, wherein said beam-combining element comprises a cross-dichroic prism, and
wherein said predetermined plane comprises at least one of an upper surface and a base surface of said cross-dichroic prism.

4. The projector as set forth in claim 1, wherein said beam-combining element includes a plurality of incident surfaces into which said plurality of image beams are irradiated, respectively and an emission surface for emitting said combined image beam, and
wherein said plurality of image-forming elements are arranged such that the image-forming surface of each image-forming element is perpendicular to said plurality of incident surfaces.

5. The projector as set forth in claim 1, wherein the image beam of said first color comprises a green image beam, the image beam of said second color comprises a red image beam, and the image beam of said third color comprises a blue image beam.

6. The projector as set forth in claim 1, wherein the long sides of said second image-forming surface are parallel to the long sides of said third image-forming surface, and the long sides of said first image-forming surface are perpendicular to the long sides of said second or third image-forming surface.

7. The projector as set forth in claim 1, wherein said plurality of reflecting elements include total reflection prisms.

8. The projector as set forth in claim 7, wherein said total reflection prisms are provided with first to third surfaces and a total reflection surface and are configured such that light that is irradiated from said first surface is transmitted through said total reflection surface and emitted from said second surface in the direction of said image-forming surface of a corresponding image-forming element, an image beam from the image-forming surface is irradiated from said second surface, and the irradiated image beam is reflected by said total reflection surface and emitted from said third surface in the direction of said beam-combining element.

9. The projector as set forth in claim 1, wherein said image-forming surfaces of said plurality of image forming elements are positioned on the same plane and oriented in a same direction.

10. The projector as set forth in claim 1, wherein all of said image-forming surfaces of said plurality of image forming elements are located in the same plane.

11. The projector as set forth in claim 1, wherein said first digital micromirror device includes a first image-forming surface that is perpendicular to said first incident surface, long sides of the first image-forming surface being parallel to said first incident surface.

12. The projector as set forth in claim 11, wherein said second digital micromirror device includes a second image-forming surface that is perpendicular to said second incident surface, long sides of the second image-forming surface being parallel to said second incident surface.

13. The projector as set forth in claim 12, wherein said third digital micromirror device includes a third image-forming surface that is perpendicular to said third incident surface.

14. A projector comprising:
a plurality of image-forming elements that are each provided with an image-forming surface including a plurality of micromirrors;
a plurality of reflecting elements that are provided so as to reflect a plurality of image beams that are formed by said plurality of image-forming elements;
a cross-dichroic prism into which said plurality of image beams are irradiated by said plurality of reflecting elements and that emits a combined image beam in which said plurality of image beams are combined such that directions of propagation of said plurality of image beams coincide; and
a projection element that projects said combined image beam that is emitted from said cross-dichroic prism,
wherein, of said plurality of image-forming elements, at least two image-forming elements are arranged such that said image-forming surface of each image-forming element is positioned parallel to a plane that is perpendicular to a dichroic film of said cross-dichroic prism,
wherein said plurality of image-forming elements include first to third digital micromirror devices, and
wherein said cross-dichroic prism includes:
an emission surface;
a first incident surface into which an image beam of a first color is irradiated from said first digital micromirror device;
a second incident surface into which an image beam of a second color is irradiated from said second digital micromirror device;
a third incident surface into which an image beam of a third color is irradiated from said third digital micromirror device;
a first dichroic film that is configured to transmit an image beam of said first color that is irradiated from said first incident surface and emit the image beam from said emission surface, reflect an image beam of said second color that is irradiated from said second incident surface and emit the image beam from said emission surface, and transmit an image beam of said third color that is irradiated from said third incident surface; and
a second dichroic film that is configured to transmit an image beam of said first color that is irradiated from said first incident surface and emit the image beam from said emission surface, reflect an image beam of said third color that is irradiated from said third incident surface and emit the image beam from said emission surface, and transmit an image beam of said second color that is irradiated from said second incident surface.

15. The projector as set forth in claim 14, wherein all of said image-forming surfaces of said plurality of image forming elements are located in a same plane.

16. The projector as set forth in claim 14, wherein said first digital micromirror device includes a first image-forming surface that is perpendicular to said first incident surface, long sides of the first image-forming surface being parallel to said first incident surface.

17. The projector as set forth in claim 16, wherein said second digital micromirror device includes a second image-forming surface that is perpendicular to said second incident surface, long sides of the second image-forming surface being parallel to said second incident surface.

18. The projector as set forth in claim 17, wherein said third digital micromirror device includes a third image-forming surface that is perpendicular to said third incident surface, long sides of the third image-forming surface being parallel to said third incident surface.

19. An image projection method that uses a plurality of image-forming elements that are each equipped with an image-forming surface including a plurality of micromirrors to project, by a projection unit, an image beam that is formed on said image-forming surfaces, said image projection method comprising:
   arranging, of said plurality of image-forming elements, at least two image-forming elements such that the image-forming surface of each image-forming element is positioned on a same plane;
   by a plurality of reflecting elements, reflecting each of a plurality of image beams that are formed by said plurality of image-forming elements;
   irradiating said plurality of image beams into a beam-combining element by said plurality of reflecting elements;
   by said beam-combining element, combining said plurality of image beams such that directions of propagation of each image beam coincide; and
   by said projection unit, projecting the combined image beam,
   wherein said plurality of image-forming elements include first to third digital micromirror devices, and
   wherein said beam-combining element includes:
      an emission surface;
      a first incident surface into which an image beam of a first color is irradiated from said first digital micromirror device;
      a second incident surface into which an image beam of a second color is irradiated from said second digital micromirror device;
      a third incident surface into which an image beam of a third color is irradiated from said third digital micromirror device;
      a first dichroic film that is configured to transmit an image beam of said first color that is irradiated from said first incident surface and emit the image beam from said emission surface, reflect an image beam of said second color that is irradiated from said second incident surface and emit the image beam from said emission surface, and transmit an image beam of said third color that is irradiated from said third incident surface; and
      a second dichroic film that is configured to transmit an image beam of said first color that is irradiated from said first incident surface and emit the image beam from said emission surface, reflect an image beam of said third color that is irradiated from said third incident surface and emit the image beam from said emission surface, and transmit an image beam of said second color that is irradiated from said second incident surface.

* * * * *